US010556977B2

(12) United States Patent
Teertstra et al.

(10) Patent No.: US 10,556,977 B2
(45) Date of Patent: Feb. 11, 2020

(54) DILUENT FOR THE PRODUCTION OF BUTYL RUBBER

(71) Applicant: ARLANXEO CANADA INC., Sarnia (CA)

(72) Inventors: Steven John Teertstra, London (CA); Gilles Arsenault, London (CA)

(73) Assignee: ARLANXEO CANADA INC., Sarnia (CA)

( * ) Notice: Subject to any disclaimer, the term of this patent is extended or adjusted under 35 U.S.C. 154(b) by 0 days.

(21) Appl. No.: 15/307,103

(22) PCT Filed: Apr. 30, 2015

(86) PCT No.: PCT/CA2015/050364
§ 371 (c)(1),
(2) Date: Oct. 27, 2016

(87) PCT Pub. No.: WO2015/164972
PCT Pub. Date: Nov. 5, 2015

(65) Prior Publication Data
US 2017/0044283 A1     Feb. 16, 2017

(30) Foreign Application Priority Data
Apr. 30, 2014   (EP) .................................. 14166687

(51) Int. Cl.
C08F 210/12     (2006.01)
C08C 19/14      (2006.01)

(52) U.S. Cl.
CPC ................................ *C08F 210/12* (2013.01)

(58) Field of Classification Search
None
See application file for complete search history.

(56) References Cited

U.S. PATENT DOCUMENTS

| 7,402,636 | B1 | 7/2008 | Shaffer et al. |
| 7,723,447 | B2 | 5/2010 | Milner et al. |
| 7,781,547 | B2 | 8/2010 | Chen et al. |
| 8,178,465 | B2 | 5/2012 | Shaffer et al. |
| 8,747,756 | B2 | 6/2014 | Feller et al. |
| 9,068,031 | B2 | 6/2015 | Paul et al. |
| 2006/0079655 | A1 | 4/2006 | Chung et al. |
| 2008/0103272 | A1 | 5/2008 | Chen et al. |
| 2008/0234447 | A1 | 9/2008 | Shaffer et al. |
| 2008/0262180 | A1* | 10/2008 | McDonald ........... B01J 19/0066 526/255 |
| 2011/0294924 | A1 | 12/2011 | Shaffer et al. |
| 2013/0158218 | A1 | 6/2013 | Thomas et al. |
| 2016/0319119 | A1* | 11/2016 | Thompson ............ C08F 210/10 |
| 2016/0347913 | A1* | 12/2016 | Thompson ................ C08J 3/07 |
| 2017/0002121 | A1* | 1/2017 | Thompson ................ C08J 3/07 |

FOREIGN PATENT DOCUMENTS

WO   WO-2008-118576 A1 * 10/2008
WO   WO-2015/095958 A1 *  7/2015

OTHER PUBLICATIONS

Family List for US 2016/0319119 A1.*
Kirk-Othmer, Encyclopedia of Chemical Technology, Bearing Materials to Carbon, 4th Edition, 1992, pp. 8-411, Abstract.
International Search Report from International Application No. PCT/CA2015/050364, dated Jul. 21, 2015, three pages.
Chinese Office Action, CN Application No. 2015-80021551.9 dated Jul. 31, 2018.

* cited by examiner

*Primary Examiner* — Robert T Butcher
(74) *Attorney, Agent, or Firm* — The Dobrusin Law Firm, P.C.

(57) ABSTRACT

Methods are provided to efficiently produce butyl rubber via a slurry polymerization process. The process comprises providing at least two monomers, wherein at least one monomer is an isoolefin and at least one monomer is a multiolefin. The monomers are combined with an initiator and an organic diluent comprising 40-60 volume % of methyl chloride and 40-60 volume % of 1,1,1,2-tetrafluoroethane and polymerized.

20 Claims, 2 Drawing Sheets

DILUENT FOR THE PRODUCTION OF BUTYL RUBBER

FIELD OF THE INVENTION

The invention relates to a method to efficiently produce butyl rubber via a slurry process in a novel diluent.

BACKGROUND

Rubbers in particular those containing repeating units derived from isoolefins are industrially prepared by carbocationic polymerization processes. Of particular importance is butyl rubber which is a elastomer of isobutylene and a smaller amount of a multiolefin such as isoprene.

The carbocationic polymerization of isoolefins and its elastomerization with multiolefins is mechanistically complex. The catalyst system is typically composed of two components: an initiator and a Lewis acid such as aluminum trichloride which is frequently employed in large scale commercial processes.

Examples of initiators include proton sources such as hydrogen halides, carboxylic acids and water.

During the initiation step, the isoolefin reacts with the Lewis acid and the initiator to produce a carbenium ion which further reacts with a monomer forming a new carbenium ion in the so-called propagation step.

The type of monomers, the polymerization temperature as well as the specific combination of Lewis acid and initiator affects the chemistry of propagation and thus monomer incorporation into the growing polymer chain.

In addition to that the type of diluent or solvent and its polarity was found to have a significant influence on the polymerization and the final polymer product as well.

Industry has generally accepted widespread use of a slurry polymerization process to produce butyl rubber, polyisobutylene, etc. in methyl chloride as diluent. Typically, the polymerization process is carried out at low temperatures, generally lower than −90° C. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of up to 40 wt.-% in the reaction mixture can be achieved, as opposed to a polymer concentration of typically at maximum 20 wt.-% in solution polymerizations. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers.

It is known from EP1572766 A to use hydrofluorocarbons as diluents for the preparation of copolymers of an isoolefin, preferably isobutylene, and a multiolefin, preferably a conjugated diene, more preferably isoprene.

However, at the low temperatures applied the rate of polymerization is typically low making it desirable to provide a process allowing a higher throughput compared to prior art processes.

SUMMARY OF THE INVENTION

According to one aspect of the invention, there is provided a process for the preparation of elastomers, the process comprising at least the steps of:

a) providing a reaction medium comprising an organic diluent, and at least two monomers whereby at least one monomer is an isoolefin and at least one monomer is a multiolefin;

b) polymerizing the monomers within the reaction medium in the presence of an initiator system to form an organic medium comprising the copolymer, the organic diluent and optionally residual monomers whereby the diluent comprises 40 to 60 vol.-% of methyl chloride and 40 to 60 vol.-% 1,1,1,2-tetrafluoroethane whereby the two components add up to 90 to 100 vol.-%, preferably 95 to 100 vol.-%, more preferably 98 to 100 vol.-% and yet even more preferably 99 to 100 vol.-% of the total volume of diluent.

DETAILED DESCRIPTION OF THE INVENTION

The invention also encompasses all combinations of preferred embodiments, ranges parameters as disclosed hereinafter with either each other or the broadest disclosed range or parameter.

Monomers

In this embodiment in step a) a reaction medium comprising an organic diluent, and at least two monomers is provided whereby at least one monomer is an isoolefin and at least one monomer is a multiolefin.

As used herein the term isoolefins denotes compounds comprising one carbon-carbon-double-bond, wherein one carbon-atom of the double-bond is substituted by two alkyl-groups and the other carbon atom is substituted by two hydrogen atoms or by one hydrogen atom and one alkyl-group.

Examples of suitable isoolefins include isoolefin monomers having from 4 to 16 carbon atoms, preferably 4 to 7 carbon atoms, such as isobutene, 2-methyl-1-butene, 3-methyl-1-butene, 2-methyl-2-butene. A preferred isolefin is isobutene.

As used herein the term multiolefin denotes compounds comprising more than one carbon-carbon-double-bond, either conjugated or non-conjugated.

Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The elastomers may further comprise further olefins which are neither isoolefins nor multiolefins.

Examples of such suitable olefins include β-pinene, styrene, divinylbenzene, diisopropenylbenzene o-, m- and p-alkylstyrenes such as o-, m- and p-methyl-styrene.

In one embodiment, the monomers employed in step a) may comprise in the range of from 80 wt.-% to 99.5 wt.-%, preferably of from 85 wt.-% to 98.0 wt.-%, more preferably of from 85 wt.-% to 96.5 wt.-%, even more preferably of from 85 wt.-% to 95.0 wt.-%, by weight of at least one isoolefin monomer and in the range of from 0.5 wt.-% to 20 wt.-%, preferably of from 2.0 wt.-% to 15 wt.-%, more preferably of from 3.5 wt.-% to 15 wt.-%, and yet even more preferably of from 5.0 wt.-% to 15 wt.-% by weight of at least one multiolefin monomer based on the weight sum of all monomers employed.

In another embodiment the monomer mixture comprises in the range of from 90 wt.-% to 95 wt.-% of at least one isoolefin monomer and in the range of from 5 wt.-% to 10 wt.-% by weight of a multiolefin monomer based on the weight sum of all monomers employed. Yet more preferably, the monomer mixture comprises in the range of from 92 wt.-% to 94 wt.-% of at least one isoolefin monomer and in the range of from 6 wt.-% to 8 wt.-% by weight of at least one multiolefin monomer based on the weight sum of all monomers employed. The isoolefin is preferably isobutene and the multiolefin is preferably isoprene.

The multiolefin content of elastomers produced according to the invention is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

The monomers may be present in the reaction medium in an amount of from 0.01 wt.-% to 80 wt.-%, preferably of from 0.1 wt.-% to 65 wt.-%, more preferably of from 10.0 wt.-% to 65.0 wt.-% and even more preferably of from 25.0 wt.-% to 65.0 wt.-%.

In one embodiment the monomers are purified before use in step a), in particular when they are recycled from step c). Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis.

Diluent

In one embodiment the diluent comprises
42 to 58 vol.-% of methyl chloride and
42 to 58 vol.-% 1,1,1,2-tetrafluoroethane
whereby the two components add up to 90 to 100 vol.-%, preferably 95 to 100 vol.-%, more preferably 98 to 100 vol.-% and yet even more preferably 99 to 100 vol.-% of the total volume of diluent.

In another embodiment the diluent comprises
45 to 55 vol.-% of methyl chloride and
45 to 55 vol.-% 1,1,1,2-tetrafluoroethane
whereby the two components add up to 90 to 100 vol.-%, preferably 95 to 100 vol.-%, more preferably 98 to 100 vol.-% and yet even more preferably 99 to 100 vol.-% of the total volume of diluent.

In yet another embodiment the diluent comprises
48 to 52 vol.-% of methyl chloride and
48 to 52 vol.-% 1,1,1,2-tetrafluoroethane
whereby the two components add up to 96 to 100 vol.-%, preferably 98 to 100 vol.-%, more preferably 99 to 100 vol.-% and yet even more preferably 99.5 to 100 vol.-% of the total weight of diluent The remainder to 100 vol.-% if existent may comprise diluents other than methyl chloride and 1,1,1,2-tetrafluoroethane such as other fluorinated or chlorinated or fluorinated and chlorinated hydrocarbons or aliphatic hydrocarbons.

Examples of other chlorinated hydrocarbons include methylene chloride or ethyl chloride.

Examples of other fluorinated hydrocarbons include diluents represented by the formula: $C_xH_yF_z$, wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one and except 1,1,1,2-tetrafluoroethane.

In one embodiment the fluorinated hydrocarbons is/are selected from the group consisting of saturated hydrofluorocarbons such as fluoromethane; difluoromethane; trifluoromethane; fluoroethane; 1,1-difluoroethane; 1,2-difluoroethane; 1,1,1-trifluoroethane; 1,1,2-trifluoroethane; 1,1,2,2-tetrafluoroethane 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3, 3,4,4-heptafluorobutane; 1,1,1,2,2,3,3,4-octafluorobutane; 1,1,1,2,2,3,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane;

Further examples of fluorinated hydrocarbons include vinyl fluoride; 1,2-difluoroethene; 1,1,2-trifluoroethene; 1-fluoropropene, 1,1-difluoropropene; 1,2-difluoropropene; 1,3-difluoropropene; 2,2-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

Examples of aliphatic hydrocarbons include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyclopentane, cis-1,2-dimethylcyclopentane, trans-1,2-dimethylcyclopentane, trans-1,3-dimethylcyclopentane, ethylcyclopentane, cyclohexane, methylcyclohexane.

The polymerization in step b) is typically carried out as a slurry polymerization.

Initiator Systems

In step b) the monomers within the reaction medium are polymerized in the presence of an initiator system to form a medium comprising the elastomer, the organic diluent and optionally residual monomers.

Initiator systems in particular for elastomers obtained by cationic polymerizations typically comprise at least one Lewis acid and at least one initiator.

Lewis Acids

Suitable Lewis acids include compounds represented by formula $MX_3$, where M is a group 13 element and X is a halogen. Examples for such compounds include aluminum trichloride, aluminum tribromide, boron trichloride, boron tribromide, gallium trichloride and indium trifluoride, whereby aluminum trichloride is preferred.

Further suitable Lewis acids include compounds represented by formula $MR_{(m)}X_{(3-m)}$, where M is a group 13 element, X is a halogen, R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; and and m is one or two. X may also be an azide, an isocyanate, a thiocyanate, an isothiocyanate or a cyanide.

Examples for such compounds include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof.

Further suitable Lewis acids include compounds represented by formula $M(RO)_nR'_mX_{(3-(m+n))}$; wherein M is a Group 13 metal; wherein RO is a monovalent hydrocarboxy radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy; R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is a number from 0 to 3 and m is an number from 0 to 3 such that the sum of n and m is not more than 3;

X is a halogen independently selected from the group consisting of fluorine, chlorine, bromine, and iodine, preferably chlorine. X may also be an azide, an isocyanate, a thiocyanate, an isothiocyanate or a cyanide.

For the purposes of this invention, one skilled in the art would recognize that the terms alkoxy and aryloxy are structural equivalents to alkoxides and phenoxides respectively. The term "arylalkoxy" refers to a radical containing both aliphatic and aromatic structures, the radical being at an alkoxy position. The term "alkylaryl" refers to a radical containing both aliphatic and aromatic structures, the radical being at an aryloxy position.

Non-limiting examples of these Lewis acids include methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride and phenoxy methylindium fluoride.

Further suitable Lewis acids include compounds represented by formula $M(RC=OO)_n R'_m X_{(3-(m+n))}$ wherein M is a Group 13 metal; wherein $RC=OO$ is a monovalent hydrocarbacyl radical selected from the group selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is a number from 0 to 3 and m is a number from 0 to 3 such that the sum of n and m is not more than 3; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkylacyloxy" refers to a radical containing both aliphatic and aromatic structures, the radical being at an alkyacyloxy position. The term "alkylarylacyloxy" refers to a radical containing both aliphatic and aromatic structures, the radical being at an arylacyloxy position. Non-limiting examples of these Lewis acids include acetoxyaluminum dichloride, benzoyloxyaluminum dibromide, benzoyloxygallium difluoride, methyl acetoxyaluminum chloride, and isopropoyloxyindium trichloride.

Further suitable Lewis acids include compounds based on metals of Group 4, 5, 14 and 15 of the Periodic Table of the Elements, including titanium, zirconium, tin, vanadium, arsenic, antimony, and bismuth.

One skilled in the art will recognize, however, that some elements are better suited in the practice of the invention. The Group 4, 5 and 14 Lewis acids have the general formula $MX_4$; wherein M is Group 4, 5, or 14 metal; and X is a halogen independently selected from the group consisting of fluorine, chlorine, bromine, and iodine, preferably chlorine. X may also be a azide, an isocyanate, a thiocyanate, an isothiocyanate or a cyanide. Non-limiting examples include titanium tetrachloride, titanium tetrabromide, vanadium tetrachloride, tin tetrachloride and zirconium tetrachloride. The Group 4, 5, or 14 Lewis acids may also contain more than one type of halogen. Non-limiting examples include titanium bromide trichloride, titanium dibromide dichloride, vanadium bromide trichloride, and tin chloride trifluoride.

Group 4, 5 and 14 Lewis acids useful in this invention may also have the general formula $MR_n X_{(4-n)}$, wherein M is Group 4, 5, or 14 metal; wherein R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; n is an integer from 0 to 4; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkyl" refers to a radical containing both aliphatic and aromatic structures, the radical being at an alkyl position.

The term "alkylaryl" refers to a radical containing both aliphatic and aromatic structures, the radical being at an aryl position.

Non-limiting examples of these Lewis acids include benzyltitanium trichloride, dibenzyltitanium dichloride, benzylzirconium trichloride, dibenzylzirconium dibromide, methyltitanium trichloride, dimethyltitanium difluoride, dimethyltin dichloride and phenylvanadium trichloride.

Group 4, 5 and 14 Lewis acids useful in this invention may also have the general formula $M(RO)_n R'_m X_{4-(m+n)}$, wherein M is Group 4, 5, or 14 metal, wherein RO is a monovalent hydrocarboxy radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy radicals; R is a monovalent hydrocarbon radical selected from the group consisting of, R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 such that the sum of n and m is not more than 4; X is selected from the group consisting of fluorine, chlorine, bromine, and iodine, preferably chlorine. X may also be an azide, an isocyanate, a thiocyanate, an isothiocyanate or a cyanide.

For the purposes of this invention, one skilled in the art would recognize that the terms alkoxy and aryloxy are structural equivalents to alkoxides and phenoxides respectively. The term "arylalkoxy" refers to a radical containing both aliphatic and aromatic structures, the radical being at an alkoxy position.

The term "alkylaryl" refers to a radical containing both aliphatic and aromatic structures, the radical being at an aryloxy position. Non-limiting examples of these Lewis acids include methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride and benzyl isopropoxyvanadium dichloride.

Group 4, 5 and 14 Lewis acids useful in this invention may also have the general formula $M(RC=OO)_n R'_m X_{4-(m+n)}$; wherein M is Group 4, 5, or 14 metal; wherein $RC=OO$ is a monovalent hydrocarbacyl radical selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 such that the sum of n and m is not more than 4; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkylacyloxy" refers to a radical containing both aliphatic and aromatic structures, the radical being at an alkylacyloxy position.

The term "alkylarylacyloxy" refers to a radical containing both aliphatic and aromatic structures, the radical being at an arylacyloxy position. Non-limiting examples of these Lewis acids include acetoxytitanium trichloride, benzoylzirconium tribromide, benzoyloxytitanium trifluoride, isopropoyloxytin trichloride, methyl acetoxytitanium dichloride and benzyl benzoyloxyvanadium chloride.

Group 5 Lewis acids useful in this invention may also have the general formula $MOX_3$; wherein M is a Group 5 metal and wherein X is a halogen independently selected from the group consisting of fluorine, chlorine, bromine, and iodine, preferably chlorine. A non-limiting example is vanadium oxytrichloride. The Group 15 Lewis acids have the general formula $MX_y$, wherein M is a Group 15 metal and X is a halogen independently selected from the group consisting of fluorine, chlorine, bromine, and iodine, preferably chlorine and y is 3, 4 or 5. X may also be an azide, an isocyanate, a thiocyanate, an isothiocyanate or a cyanide. Non-limiting examples include antimony hexachloride, antimony hexafluoride, and arsenic pentafluoride. The Group 15 Lewis acids may also contain more than one type of halogen. Non-limiting examples include antimony chloride pentafluoride, arsenic trifluoride, bismuth trichloride and arsenic fluoride tetrachloride.

Group 15 Lewis acids useful in this invention may also have the general formula $MR_nX_{y-n}$; wherein M is a Group 15 metal; wherein R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; and n is an integer from 0 to 4; y is 3, 4 or 5 such that n is less than y; X is a halogen independently selected from the group consisting of fluorine, chlorine, bromine, and iodine, preferably chlorine. X may also be a an azide, an isocyanate, a thiocyanate, an isothiocyanate or a cyanide. The term "arylalkyl" refers to a radical containing both aliphatic and aromatic structures, the radical being at an alkyl position. The term "alkylaryl" refers to a radical containing both aliphatic and aromatic structures, the radical being at an aryl position. Non-limiting examples of these Lewis acids include tetraphenylantimony chloride and triphenylantimony dichloride.

Group 15 Lewis acids useful in this invention may also have the general formula $M(RO)_nR'_mX_{y-(m+n)}$, wherein M is a Group 15 metal, wherein RO is a monovalent hydrocarboxy radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy radicals; R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be an azide, an isocyanate, a thiocyanate, an isothiocyanate or a cyanide. For the purposes of this invention, one skilled in the art would recognize that the terms alkoxy and aryloxy are structural equivalents to alkoxides and phenoxides respectively. The term "arylalkoxy" refers to a radical containing both aliphatic and aromatic structures, the radical being at an alkoxy position. The term "alkylaryl" refers to a radical containing both aliphatic and aromatic structures, the radical being at an aryloxy position. Non-limiting examples of these Lewis acids include tetrachloromethoxyantimony, dimethoxytrichloroantimony, dichloromethoxyarsine, chlorodimethoxyarsine, and difluoromethoxyarsine. Group 15 Lewis acids useful in this invention may also have the general formula $M(RC=OO)_nR'_mX_{y-(m+n)}$; wherein M is a Group 15 metal; wherein $RC=OO$ is a monovalent hydrocarbacyloxy radical selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be an azide, an isocyanate, a thiocyanate, an isothiocyanate or a cyanide. The term "arylalkylacyloxy" refers to a radical containing both aliphatic and aromatic structures, the radical being at an alkyacyloxy position. The term "alkylarylacyloxy" refers to a radical containing both aliphatic and aromatic structures, the radical being at an arylacyloxy position. Non-limiting examples of these Lewis acids include acetatotetrachloroantimony, (benzoato) tetrachloroantimony, and bismuth acetate chloride.

Lewis acids such as methylaluminoxane (MAO) and specifically designed weakly coordinating Lewis acids such as $B(C_6F_5)_3$ are also suitable Lewis acids within the context of the invention.

Weakly coordinating Lewis acids are exhaustively disclosed in WO 2004/067577A in sections [117] to [129] which are hereby incorporated by reference.

Initiators

Initiators useful in this invention are those initiators which are capable of being complexed with the chosen Lewis acid to yield a complex which reacts with the monomers thereby forming a propagating polymer chain.

In a preferred embodiment the initiator comprises at least one compound selected from the groups consisting of water, hydrogen halides, carboxylic acids, carboxylic acid halides, sulfonic acids, sulfonic acid halides, alcohols, phenols, tertiary alkyl halides, tertiary aralkyl halides, tertiary alkyl esters, tertiary aralkyl esters, tertiary alkyl ethers, tertiary aralkyl ethers, alkyl halides, aryl halides, alkylaryl halides and arylalkylacid halides.

Preferred hydrogen halide initiators include hydrogen chloride, hydrogen bromide and hydrogen iodide. A particularly preferred hydrogen halide is hydrogen chloride.

Preferred carboxylic acids include both aliphatic and aromatic carboxylic acids. Examples of carboxylic acids useful in this invention include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid.

Carboxylic acid halides useful in this invention are similar in structure to carboxylic acids with the substitution of a halide for the OH of the acid. The halide may be fluoride, chloride, bromide, or iodide, with the chloride being preferred.

Carboxylic acid halides useful in this invention include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride.

Sulfonic acids useful as initiators in this invention include both aliphatic and aromatic sulfonic acids. Examples of preferred sulfonic acids include methanesulfonic acid, trifluoromethanesulfonic acid, trichloromethanesulfonic acid and p-toluenesulfonic acid.

Sulfonic acid halides useful in this invention are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this invention include methanesulfonyl chloride, methanesulfonyl bromide, trichloromethanesulfonyl chloride, trifluoromethanesulfonyl chloride and p-toluenesulfonyl chloride.

Alcohols useful in this invention include methanol, ethanol, propanol, 2-propanol, 2-methylpropan-2-ol, cyclohexanol, and benzyl alcohol. Phenols useful in this invention include phenol; 2-methylphenol; 2,6-dimethylphenol; p-chlorophenol; p-fluorophenol; 2,3,4,5,6-pentafluorophenol; and 2-hydroxynaphthalene.

Preferred tertiary alkyl and aralkyl initiators include tertiary compounds represented by the formula below: wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably containing 1 to 15 carbon atoms and more preferably 1 to 8 carbon atoms. n is the number of initiator sites and is a number greater than or equal to 1, preferably between 1 to 30, more preferably n is a number from 1 to 6. The arylalkyls may be substituted or unsubstituted. For the purposes of this invention and any claims thereto, arylalkyl is defined to mean a compound containing both aromatic and aliphatic structures. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1,4-bis(1-chloro-1-methylethyl) benzene; 5-ter-butyl-1,3-bis(1-chloro-1-methylethyl) benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl) benzene; 5-tert-butyl-1,3-bis(1-acetoxy-1-methylethyl) benzene; 2-methoxy-2,4,4-trimethylpentane; 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1-methylethylbenzene; 1-methoxyadamantane; 1-methoxyethylbenzene; 1,4-bis(1-methoxy-1-methylethyl) benzene; 5-tert-butyl-1,3-bis(1-methoxy-1-methylethyl) benzene and 1,3,5-tris(1-chloro-1-methylethyl) benzene. Other suitable initiators can be found in U.S. Pat. No. 4,946,899. For the purposes of this invention and the claims thereto pseudohalogen is defined to be any compound that is an azide, an isocyanate, a thiocyanate, an isothiocyanate or a cyanide.

Another preferred initiator is a polymeric halide, one of $R_1$, $R_2$ or $R_3$ is an olefin polymer and the remaining R groups are defined as above. Preferred olefin polymers include polyisobutylene, polypropylene, and polyvinylchloride. The polymeric initiator may have halogenated tertiary carbon positioned at the chain end or along or within the backbone of the polymer. When the olefin polymer has multiple halogen atoms at tertiary carbons, either pendant to or within the polymer backbone, the product may contain polymers which have a comb like structure and/or side chain branching depending on the number and placement of the halogen atoms in the olefin polymer. Likewise, the use of a chain end tertiary polymer halide initiator provides a method for producing a product which may contain block elastomers.

Particularly preferred initiators may be any of those useful in cationic polymerization of isobutylene elastomers including: water, hydrogen chloride, 2-chloro-2,4,4-trimethylpentane, 2-chloro-2-methylpropane, 1-chloro-1-methylethylbenzene, and methanol.

Initiator systems useful in this invention may further comprise compositions comprising a reactive cation and a weakly-coordinating anion ("WCA") as defined above.

A preferred mole ratio of Lewis acid to initiator is generally from 1:5 to 100:1 preferably from or from 5:1 to 100:1, more preferably from 8:1 to 20:1.

The lewis acid is preferably present in the reaction mixture in an amount of 0.002 to 5.0 mol.-%, preferably of 0.1 to 0.5 mol.-%, based on the sum of the monomers.

It is of course understood that greater or lesser amounts of initiator are still within the scope of this invention.

In a particularly preferred initiator system, the Lewis acid is ethyl aluminum sesquichloride, preferably generated by mixing equimolar amounts of diethyl aluminum chloride and ethyl aluminum dichloride, preferably in a diluent.

In another particularly preferred initiator system, the Lewis acid is ethyl aluminum dichloride, preferably in a diluent.

Where alkyl aluminum halides are employed hydrogen chloride water and/or alcohols, preferably water is used as proton source.

In one embodiment the amount of water is in the range of 0.40 to 4.0 moles of water per mole of aluminum of the alkyl aluminum halides, preferably in the range of 0.5 to 2.5 moles of water per mole of aluminum of the alkyl aluminum halides, most preferably 1 to 2 moles of water per mole of the aluminum alkyl halide.

In another embodiment the amount of hydrogen chloride is in the range of 0.10 to 1 moles of hydrogen chloride per mole of aluminum of the alkyl aluminum halides, preferably in the range of 0.2 to 0.5 moles of hydrogen chloride per mole of aluminum of the alkyl aluminum halides.

Polymerization Conditions

In one embodiment, the organic diluent and the monomers employed are substantially free of water. As used herein substantially free of water is defined as less than 50 ppm based upon total weight of the reaction medium, preferably less than 30 ppm, more preferably less than 20 ppm, even more preferably less than 10 ppm, yet even more preferably less than 5 ppm.

One skilled of the art is aware that the water content in the organic diluent and the monomers needs to be low to ensure that the initiator system is not affected by additional amounts of water which are not added by purpose e.g. to serve as an initiator.

Steps a) and/or b) may be carried out in continuous or batch processes, whereby continuous processes are preferred.

In an embodiment of the invention the polymerization according to step b) is effected using a polymerization reactor. Suitable reactors are those known to the skilled in the art and include flow-through polymerization reactors, plug flow reactor, stirred tank reactors, moving belt or drum reactors, jet or nozzle reactors, tubular reactors, and autorefrigerated boiling-pool reactors. Specific suitable examples are disclosed in WO 2011/000922 A and WO 2012/089823 A.

In one embodiment, the polymerization according to step b) is carried out where the initiator system, the monomers and the organic diluent are present in a single phase. Preferably, the polymerization is carried-out in a continuous polymerization process in which the initiator system, monomer(s) and the organic diluent are present as a single phase.

In slurry polymerization, the monomers, the initiator system are all typically soluble in the diluent or diluent mixture, i.e., constitute a single phase, while the elastomer upon formation precipitates from the organic diluent. Desirably, reduced or no polymer "swelling" is exhibited as indicated by little or no Tg suppression of the polymer and/or little or no organic diluent mass uptake.

The solubilities of the desired polymers in the organic diluents described above as well as their swelling behaviour under reaction conditions is well known to those skilled in the art.

In one embodiment step b) is carried out at a temperature in the range of from the freezing point of the diluent to 20° C., typically in the range of from −100° C. to 20° C., preferably in the range of −100° C. to −50° C. and even more preferably in the range of −95° C. to −70° C.

In a preferred embodiment, the polymerization temperature is within 20° C. above the freezing point of the organic diluent, preferably within 10° C. above the freezing point of the diluent.

The reaction pressure in step b) is typically from 100 to 100,000 hP, preferably from 200 to 20,000 hPa, more preferably from 500 to 5,000 hPa.

The polymerization according to step b) is typically carried out in a manner that the solids content of the slurry in step b) is preferably in the range of from 1 to 45 wt.-%, more preferably 3 to 40 wt.-%, even more preferably 15 to 40 wt.-%.

As used herein the terms "solids content" or "solids level" refer to weight percent of the elastomer obtained according to step b) i.e. in polymerization and present in the medium comprising the elastomer, the organic diluent and optionally residual monomers obtained according to step b).

In one embodiment the reaction time in step b) is from 2 min to 2 h, preferably from 10 min to 1 h and more preferably from 20 to 45 min.

The process may be carried out batchwise or continuously. Where a continuous reaction is performed the reaction time given above represents the average residence time.

In one embodiment the reaction is stopped by quenching agents for example a 1 wt.-% sodium hydroxide solution in water, methanol or ethanol.

In another embodiment the reaction is quenched by the contact with the aqueous medium in step c), which in one embodiment may have a pH value of 5 to 10, preferably 6 to 9 and more preferably 7 to 9 measured at 20° C. and 1013 hPa.

The pH-Adjustment where desired may be performed by addition of acids or alkaline compounds which preferably do not contain multivalent metal ions. pH adjustment to higher pH values is e.g. effected by addition of sodium or potassium hydroxide.

The conversion is typically stopped after a monomer consumption of from 5 wt.-% to 90 wt.-%, preferably of from 5 to 50 wt.-% and in another embodiment of from 5 to 25 wt.-%, preferably 10 wt.-% to 20 wt.-% of the initially employed monomers.

The elastomers may be isolated by standard techniques known to those skilled in the art.

Typically in a step c) residual monomers of the monomer mixture and preferably additionally the diluent from the reaction medium is at least partially removed to obtain the elastomer, preferably by distillation.

Removal of residual monomers and diluent may also employ other types of distillation so to subsequently or jointly remove the residual monomers and the organic diluent to the desired extent. Distillation processes to separate liquids of different boiling points are well known in the art and are described in, for example, the *Encyclopedia of Chemical Technology*, Kirk Othmer, 4th Edition, pp. 8-311, which is incorporated herein by reference. Generally, the diluent and residual monomers may either be seperatly or jointly be recycled into a step a) of a polymerization reaction.

In one embodiment the weight average molecular weight of the elastomer obtained according to the invention is in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 250 to 550 kg/mol, and most preferably in the range of from 250 to 500 kg/mol. Molecular weights are obtained using gel permeation chromatography in tetrahydrofuran (THF) solution using polystyrene molecular weight standards if not mentioned otherwise.

In one embodiment the polydispersity of the elastomers according to the invention is in the range of 1.5 to 4.5, preferably 2.0 to 3.5 as measured by the ratio of weight average molecular weight to number average molecular weight as determined by gel permeation chromatography.

The elastomer has a Mooney viscosity of at least 30 (ML 1+8 at 125° C., ASTM D 1646), preferably of from 30 to 60 and even more preferably of from 30 to 45 (ML 1+8 at 125° C., ASTM D 1646).

The invention further encompasses elastomers obtainable by the process according to the invention.

The advantage of the present invention is the fact that due to the novel diluent blend according to the invention very high reaction rates at low temperatures can be achieved while simultaneously obtaining elastomers having a low polydispersity.

The invention is hereinafter further explained by the examples without being limited thereto.

Experimental Section:

General Procedure for Polymerization:

All polymerizations were performed in a dried, inert atmosphere. Batch reactions were run in 600 mL stainless steel reaction vessels, equipped with an overhead 4-blade stainless steel impeller driven by an external electrically driven stirrer. Reaction temperature was measured via a thermocouple. The reactor was cooled to the desired reaction temperature, listed in the Tables, by immersing the assembled reactor into a pentane cooling bath. The temperature of the stirred hydrocarbon bath was controlled to ±2° C. All apparatus in liquid contact with the reaction medium were dried at 150° C. for at least 6 hours and cooled in a vacuum-nitrogen atmosphere alternating chamber before use.

High purity isobutene and methyl chloride were received from a manufacturing facility and used as is. The hydrofluorocarbon 1,1,1,2-tetrafluoroethane (>99.9% purity) (HFC-134a, Genetron@ 134a) was used as received. All were condensed and collected as liquids in the dry box.

Isoprene (Sigma-Aldrich, >99.5% purity) was dried over activated 3A molecular sieves for several days and distilled under nitrogen. A 1.0 M solution of ethylaluminum dichloride in hexanes (Sigma-Aldrich) was used as received.

A solution of $HCl/CH_2Cl_2$ was prepared by bubbling anhydrous HCl gas (Sigma-Aldrich, 99% purity) through a pre-dried Sure/Seal™ bottle containing anhydrous $CH_2Cl_2$ (VWR). The $HCl/CH_2Cl_2$ solution was then titrated using 0.1 N NaOH (VWR) standard solution to determine its concentration.

The slurry polymerizations were performed by charging isobutene, isoprene and the diluent (specified in each of the examples) into a chilled 600 mL stainless steel reaction vessel at polymerization temperature and stirred at a predetermined stirring speed between 500 to 900 rpm.

The initiator systems were prepared in methyl chloride. The initiator systems were prepared under the same temperature conditions as the reaction vessel by diluting the $HCl/CH_2Cl_2$ solution into an aliquot of methyl chloride and adding the 1.0 M solution of the ethylaluminum dichloride to a 1:4 molar ratio of HCl:EADC, followed by gentle swirling. The initiator/coinitiator solution was used immediately, added to the polymerization using a chilled glass Pasteur pipette. The reaction was allowed to run for 5 minutes and stopped by the addition of 2 mL of a 1% sodium hydroxide in ethanol solution. Conversion is reported as weight percent of monomers converted to polymer during polymerization after isolation and vacuum drying of the polymer.

Raman Spectroscopy:

A Kaiser Raman RXN2 was used to collect spectra from 0-3400 $cm^{-1}$ with iC Raman software from Kaiser Optical Systems, version 4.1.915 SP1, using the following parameters: Laser wavelength 785 nm, Resampling Interval: 1 $cm^{-1}$, Auto-cal enabled, Frequency: 1 day; Channel 1; Auto-Adjust Exposure: Enabled, Target Total Exposure Time: 6 seconds, Cosmic Ray Removal: True, Intensity Correction: True. Spectra were collected at 10 or 11 sec intervals with a scan exposure time ranging from 0.8 to 2.0 seconds and a total of four scans collected. Spectra with only diluent and isoprene were collected prior to the addition of isobutene in order to obtain a baseline where zero isobutene was present. Once isobutene and initiator were added the reaction was monitored using the isobutene peaks at 800-815 $cm^{-1}$. Peak areas were calculated from a two-point baseline selection around each peak.

Characterization:

Isoprene incorporation (total unsaturation) was determined by $^1$H-NMR spectrometry. NMR measurements were obtained using a Bruker DRX 500 MHz spectrometer (500.13 MHz) using $CDCl_3$ solutions of polymers with the residual $CHCl_3$ peak used as an internal reference.

The molecular weight of the polymers was determined by GPC (gel permeation chromatography) using a Waters 2690/5 Separations Module and a Waters 2414 Refractive Index Detector. Tetrahydrofuran was used as eluent (0.8 mL/min, 35° C.) with a series of three Agilent PL gel 10 μm Mixes-B LS 300×5.7 mm columns.

Examples 1 to 5

A series of polymerizations were performed in pure methylchloride, pure 1,1,1,2-tetrafluoroethane and various blend ratios of 1,1,1,2-tetrafluoroethane with methylchloride at −95° C. All polymerizations were performed consistently as described above. Polymerizations were run with 180 mL diluent, 20 mL isobutene and 0.6 mL (2.3 mol.-%) isoprene. The initiator system solution was prepared in 80 mL methylchloride by adding 11 mL of a 0.18 M $HCl/CH_2Cl_2$ solution and 8 mL of a 1.0 M hexane solution of ethylaluminum dichloride (EADC). 5 ml of said initiator system solution was used for all polymerizations according to examples 1 to 5.

A Raman probe was placed directly into the reaction medium in order to monitor the progress of the reaction. The results are summarized in Table 1:

TABLE 1

| Ex. | Diluent | Vol (%) | Reaction Delta T (° C.) | Conversion (Wt. %) | Total Unsats[1] (mol %) | Mw × 10³ | Mw/Mn |
|---|---|---|---|---|---|---|---|
| 1* | CH₃Cl | 100 | 7.8 | 78 | 1.49 | 468 | 4.7 |
| 2* | CH₃Cl/ HFC-134a | 75/25 | 9.8 | 81 | 1.62 | 322 | 3.6 |
| 3 | CH₃Cl/ HFC-134a | 50/50 | 10.9 | 89 | 1.82 | 261 | 3.3 |
| 4* | CH₃Cl/ HFC-134a | 25/75 | 9.6 | 88 | 2.03 | 241 | 3.6 |
| 5* | HFC-134a | 100 | 8.8 | 72 | 1.87 | 291 | 4.9 |

*for comparison

Figure 1:
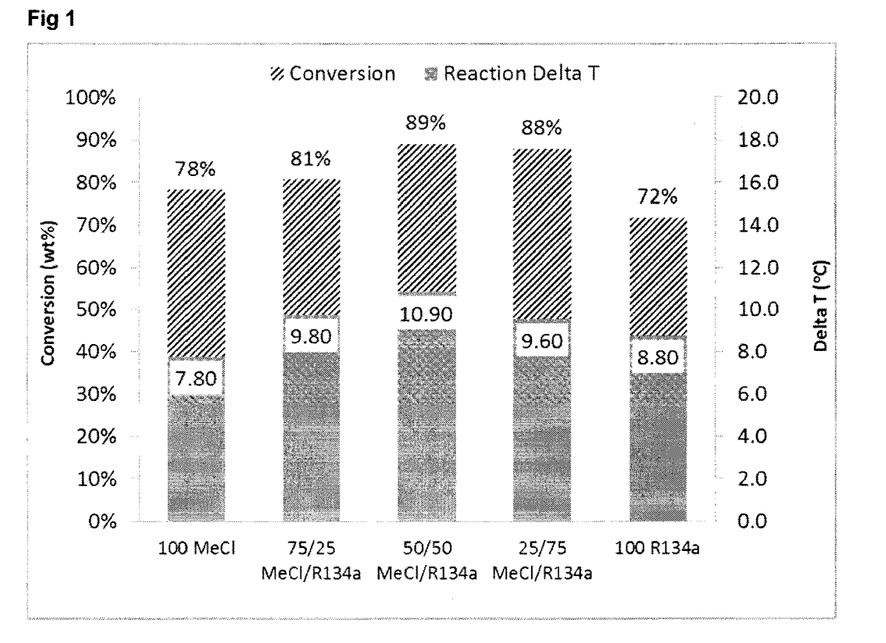
FIG. 1 depicts a bar graph showing conversion and reaction delta T of examples 1 to 5.
Figure 2:
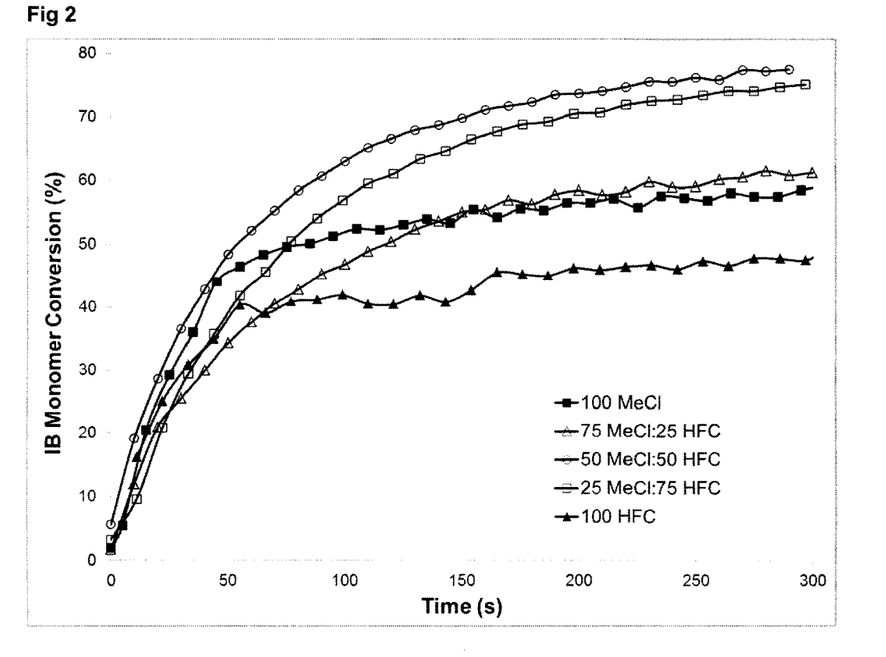
FIG. 2 depicts a line graph showing isobutene (IB) monomer conversion as a function of reaction time for examples 1 to 5; and, FIG. 3 depicts a bar graph showing molecular weight (Mw) and polydispersity (PDI) for elastomers produced in examples 1 to 5.

Conversion and Reaction delta T of examples 1 to 5 are depicted in FIG. 1 and FIG. 2. It is apparent and surprising that for the 50/50 v/v ratio of methyl chloride and 1,1,1,2-tetrafluoroethane the highest temperature rise and thus the highest rate of polymerization is observed during the reaction and the yield of butyl rubber produced is at a maximum at this diluent ratio. The observed temperature rise and conversions decrease as the ratio of either methyl chloride or HFC-134A is increased to 100% as illustrated in FIG. 1. This is an important advantage for a continuous slurry production process in order to maximize the throughput of the polymerization reactors.

Figure 3:
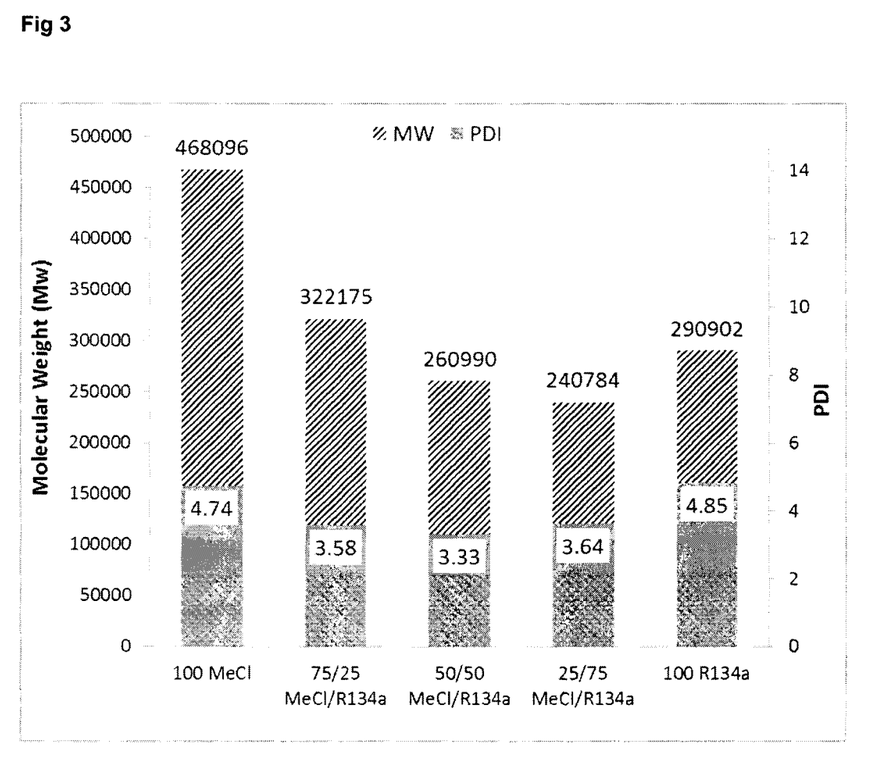

In addition to that butyl rubber produced by slurry polymerization reactions performed in various ratios of methyl chloride and HFC-134A displayed a minimum in the polydispersity (PDI) for a 50/50 ratio of of methyl chloride and 1,1,1,2-tetrafluoroethane. As illustrated in FIG. 3, an increase in either methyl chloride or HFC-134A ratio results in products with higher polydispersity values. A narrow molecular weight distribution can lead to materials with improved processibility characteristics, which is advantageous for mixing operations to produce tire innerliner compounds.

The invention claimed is:

1. A process for the preparation of elastomers, the process comprising:
    polymerizing at least two monomers comprising at least one isoolefin and at least one multiolefin within a reaction medium comprising an organic diluent, and in the presence of an initiator system to form an organic medium slurry comprising elastomer, the organic diluent, and optionally residual monomers,
    whereby the organic diluent comprises
        48 to 52 vol.-% of methyl chloride, and
        48 to 52 vol.-% 1,1,1,2-tetrafluoroethane, and
    the methyl chloride and tetrafluoroethane add up to 90 to 100 vol.-% of the total volume of organic diluent.

2. The process according to claim 1, wherein the monomers comprise 80 wt.-% to 99.5 wt.-% by weight of the at least one isoolefin monomer and 0.5 wt.-% to 20 wt.-% by weight of the at least one multiolefin monomer based on the weight sum of all monomers employed.

3. The process according to claim 1, wherein the isoolefin is isobutene.

4. The process according to claim 1, wherein the multiolefin is isoprene.

5. The process according to claim 1, wherein the methyl chloride and tetrafluoroethane add up to 95 to 100 vol.-% of the total volume of the organic diluent.

6. The process according to claim 1, wherein
the methyl chloride and tetrafluoroethane add up to 98 to 100 vol.-% of the total volume of the organic diluent.

7. The process according to claim 1, wherein
the methyl chloride and tetrafluoroethane add up to 99.5 to 100 vol.-% of the total volume of the organic diluent.

8. The process according to claim 1, wherein the initiator system comprises at least one Lewis acid and at least one initiator.

9. The process according to claim 8, wherein:
the Lewis acid comprises methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride or any mixture thereof; and
the initiator comprises at least one compound selected from the group consisting of water, hydrogen halides, carboxylic acids, carboxylic acid halides, sulfonic acids, sulfonic acid halides, alcohols, phenols, tertiary alkyl halides, tertiary aralkyl halides, tertiary alkyl esters, tertiary aralkyl esters, tertiary alkyl ethers, tertiary aralkyl ethers, alkyl halides, aryl halides, alkylaryl halides and arylalkylacid halides.

10. The process according to claim 9, wherein the initiator comprises hydrogen chloride, water and methanol.

11. The process according to claim 9, wherein the mole ratio of Lewis acid to initiator is from 1:5 to 100:1.

12. The process according to claim 1, wherein the polymerization is carried out at a temperature in the range of from −100° C. to 20° C.

13. The process according to claim 1, wherein the polymerization is carried out in a manner such that the organic medium slurry has a solids content of 1 to 45 wt.-%.

14. The process according to claim 1, wherein the polymerization is stopped after a monomer consumption of 5 wt.-% to 90 wt.-% of the initially employed monomers.

15. The process according to claim 1, wherein the organic medium slurry contains residual monomers and diluent, and the process further comprises at least partially removing the residual monomers of the monomer mixture and the diluent from the organic medium slurry.

16. The process according to claim 1, wherein the elastomer has a weight average molecular weight of 10 to 2,000 kg/mol.

17. The process according to claim 1, wherein the elastomer has a polydispersity of 1.5 to 4.5, as measured by the ratio of weight average molecular weight to number average molecular weight as determined by gel permeation chromatography.

18. The process according to claim 1, wherein the elastomer has a Mooney viscosity of from 30 to 60 ML 1+8 at 125° C. in accordance with ASTM D 1646.

19. An elastomer obtained by the process according to claim 1.

20. The process according to claim 1, wherein:
the isoolefin is isobutene;
the multiolefin is isoprene;
the monomers comprise 85 wt.-% to 95 wt.-% of the isobutene and 5 wt.-% to 15 wt.-% of the isoprene based on weight sum of all monomers;
whereby the methyl chloride and tetrafluoroethane add up to 99.5 to 100 vol.-% of the total volume of the organic diluent;
the initiator system comprises:
at least one Lewis acid selected from the group consisting of methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof; and
at least one initiator selected from the group consisting of water, hydrogen halides, carboxylic acids, carboxylic acid halides, sulfonic acids, sulfonic acid halides, alcohols, phenols, tertiary alkyl halides, tertiary aralkyl halides, tertiary alkyl esters, tertiary aralkyl esters, tertiary alkyl ethers, tertiary aralkyl ethers, alkyl halides, aryl halides, alkylaryl halides and arylalkylacid halides;
at a mole ratio of Lewis acid to initiator of 8:1 to 20:1; and
the polymerization is carried out at a temperature of −95° C. to −70° C., in a manner such that the organic medium slurry has a solids content of 15 to 40 wt.-%, and the polymerization is stopped after a monomer consumption of 10 wt.-% to 20 wt.-% of the initially employed monomers.

* * * * *